(12) United States Patent
Gloisten et al.

(10) Patent No.: US 7,566,154 B2
(45) Date of Patent: Jul. 28, 2009

(54) AIRCRAFT LED DOME LIGHT HAVING ROTATABLY RELEASABLE HOUSING MOUNTED WITHIN MOUNTING FLANGE

(75) Inventors: Jennifer L. Gloisten, Farmingville, NY (US); Frederick Reisfeld, Commack, NY (US); Samuel Zeng, Flushing, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 11/526,359

(22) Filed: Sep. 25, 2006

(65) Prior Publication Data

US 2008/0074889 A1     Mar. 27, 2008

(51) Int. Cl.
*F21S 8/10* (2006.01)
(52) U.S. Cl. .................. 362/545; 362/240; 362/246; 362/247; 362/364; 362/365; 362/470; 362/471
(58) Field of Classification Search .............. 362/294, 362/545, 249, 235, 252, 247, 555, 240, 242, 362/243, 246, 268, 375, 293, 373, 470, 471, 362/489, 490, 269, 646, 649, 251, 295, 394, 362/147, 640, 647, 148, 150, 457, 353, 95, 362/186, 191, 656, 365, 370–372, 202–208, 362/27, 560, 472
See application file for complete search history.

(56) References Cited

U.S. PATENT DOCUMENTS

| | | | |
|---|---|---|---|
| 4,962,687 A | 10/1990 | Bellieveau et al. | |
| 5,677,603 A | 10/1997 | Speirs et al. | |
| 5,713,654 A | 2/1998 | Scifres | |
| 5,785,418 A | 7/1998 | Hochstein | |
| 5,803,579 A | 9/1998 | Turnbull et al. | |
| 6,016,038 A | 1/2000 | Mueller et al. | |
| 6,132,072 A | 10/2000 | Turnbull et al. | |
| 6,152,588 A | 11/2000 | Scifres | |
| 6,335,548 B1 | 1/2002 | Roberts et al. | |
| 6,350,043 B1 | 2/2002 | Gloisten | |
| 6,441,943 B1 * | 8/2002 | Roberts et al. | 359/267 |
| 6,517,218 B2 | 2/2003 | Hochstein | |
| 6,520,666 B1 * | 2/2003 | Beyerlein et al. | 362/471 |
| 6,523,976 B1 | 2/2003 | Turnbull et al. | |
| 6,548,967 B1 | 4/2003 | Dowling et al. | |
| 6,577,080 B2 | 6/2003 | Lys et al. | |
| 6,578,994 B1 | 6/2003 | Beyerlein | |
| 6,608,453 B2 | 8/2003 | Morgan et al. | |
| 6,623,151 B2 | 9/2003 | Pederson | |
| 6,624,597 B2 | 9/2003 | Dowling et al. | |
| 6,672,745 B1 | 1/2004 | Bauer et al. | |
| 6,791,840 B2 * | 9/2004 | Chun | 361/715 |

(Continued)

*Primary Examiner*—Anabel Ton
*Assistant Examiner*—Kevin Spinella
(74) *Attorney, Agent, or Firm*—Drinker Biddle & Reath LLP

(57) ABSTRACT

A lighting fixture for providing illumination comprising a housing, a printed circuit board, and a plurality LEDs connected to the printed circuit board. Optionally an emergency LED may also be included. A heat sink is connected to the housing and printed circuit board. Each of the plurality of the LEDs is mounted on the heat sink. A reflector is disposed inside the housing such that the light from the LEDs is mixed together and projected out of the illumination end of the housing by the surface of the reflector. The lighting fixture is received into a mounting flange assembly. A method for providing illumination using the above.

16 Claims, 4 Drawing Sheets

U.S. PATENT DOCUMENTS

| | | |
|---|---|---|
| 6,871,983 B2 * | 3/2005 | Jacob et al. ............... 362/364 |
| 6,874,910 B2 | 4/2005 | Sugimoto et al. |
| 6,899,443 B2 | 5/2005 | Rizkin et al. |
| 6,930,332 B2 | 8/2005 | Hashimoto et al. |
| 6,932,495 B2 | 8/2005 | Sloan et al. |
| 6,966,674 B2 | 11/2005 | Tsai |
| 7,070,310 B2 * | 7/2006 | Pond et al. ............... 362/545 |
| 7,281,818 B2 * | 10/2007 | You et al. ............... 362/241 |
| 2001/0014021 A1 * | 8/2001 | Duff et al. ............... 362/268 |
| 2003/0011538 A1 | 1/2003 | Lys et al. |
| 2003/0048641 A1 | 3/2003 | Alexanderson et al. |
| 2003/0057887 A1 | 3/2003 | Dowling et al. |
| 2003/0057890 A1 | 3/2003 | Lys et al. |
| 2003/0072157 A1 | 4/2003 | Nolan et al. |
| 2003/0133292 A1 | 7/2003 | Mueller et al. |
| 2003/0156425 A1 | 8/2003 | Turnbull et al. |
| 2003/0210554 A1 * | 11/2003 | Broelemann ............... 362/471 |
| 2003/0227774 A1 | 12/2003 | Martin et al. |
| 2004/0032745 A1 | 2/2004 | Pederson |
| 2004/0052076 A1 | 3/2004 | Mueller et al. |
| 2004/0065894 A1 * | 4/2004 | Hashimoto et al. ........ 257/100 |
| 2004/0100787 A1 * | 5/2004 | Harris ............... 362/20 |
| 2005/0007784 A1 * | 1/2005 | Stein et al. ............... 362/307 |
| 2005/0157492 A1 * | 7/2005 | Chiu ............... 362/184 |
| 2005/0168989 A1 * | 8/2005 | Mullen ............... 362/268 |
| 2005/0168990 A1 | 8/2005 | Nagata et al. |
| 2005/0174791 A1 * | 8/2005 | Bynum ............... 362/490 |
| 2006/0092649 A1 | 5/2006 | Bynum ............... 362/488 |
| 2006/0111793 A1 * | 5/2006 | Stokes et al. ............... 700/3 |
| 2006/0176699 A1 * | 8/2006 | Crunk ............... 362/294 |
| 2006/0245194 A1 * | 11/2006 | Kikuchi et al. ............... 362/257 |
| 2006/0291209 A1 * | 12/2006 | Booth et al. ............... 362/247 |
| 2008/0043478 A1 * | 2/2008 | Wang ............... 362/373 |

* cited by examiner

AIRCRAFT LED DOME LIGHT HAVING ROTATABLY RELEASABLE HOUSING MOUNTED WITHIN MOUNTING FLANGE

FIELD OF THE INVENTION

This invention pertains to general illumination, specifically to providing light from LEDs for use on business jets, commercial aircraft and other transportation vehicles.

BACKGROUND OF THE INVENTION

Conventional methods and devices for providing lighting are generally known. For instance, dome lights are installed in business jets and commercial aircraft to allow passengers to see the aisles, door handles and signs. Conventional dome lights utilize arrays of 5 mm LEDs to provide illumination. Problems exist, however, with these conventional lights, because when they are mounted in the ceiling, they do not provide enough ambient light to clearly illuminate the floor and aisle. Instead, in a manner similar to spotlights, only the area directly in front of them is illuminated. This leaves large gaps of dimly lit areas between the lights. Adding more LEDs to a conventional dome light is not desirable because the additional LEDs not only increase the amount of heat generated by the light fixture and increase the size of the light fixture, but also result in light that is too bright for passengers to comfortably look into. A need exists for an improved ambient lighting method and device for the cabins of aircraft and other transportation vehicles. A light fixture is needed that can provide widely dispersed, diffuse, ambient lighting that is not blinding or uncomfortable for passengers to look into.

BRIEF SUMMARY OF THE INVENTION

The invention is generally directed to a light fixture and method of providing ambient lighting suitable for use in an aircraft cabin. The light fixture utilizes light emitting diodes (LEDs) and a reflector to generate bright but diffuse light. The combination of LEDs and the reflector allows a very small number of LEDs to be used to provide light that is bright enough for a passenger to see relatively large areas clearly, but is diffuse enough that a passenger can comfortably look into the light. The small number of LEDs allows the lighting fixture housing size and weight to be minimized, and decreases the amount of heat produced by the light fixture.

DETAILED DESCRIPTION OF THE INVENTION

Figure 1:
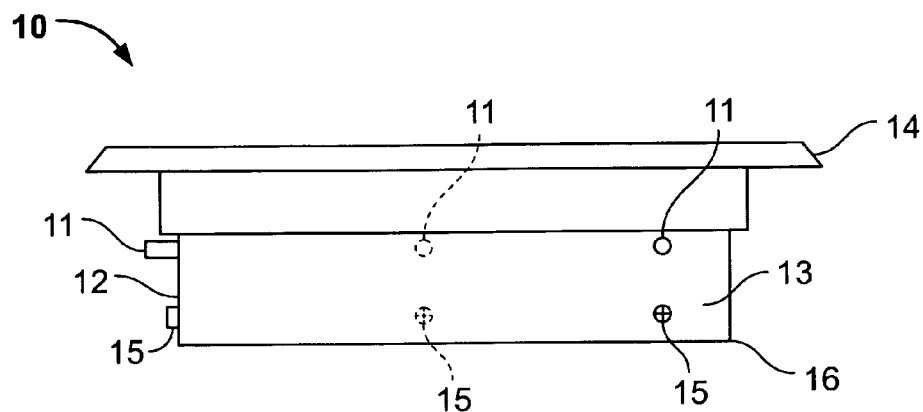
FIG. 1 is a side view of a light fixture configured according to an embodiment of the invention.
Figure 2:
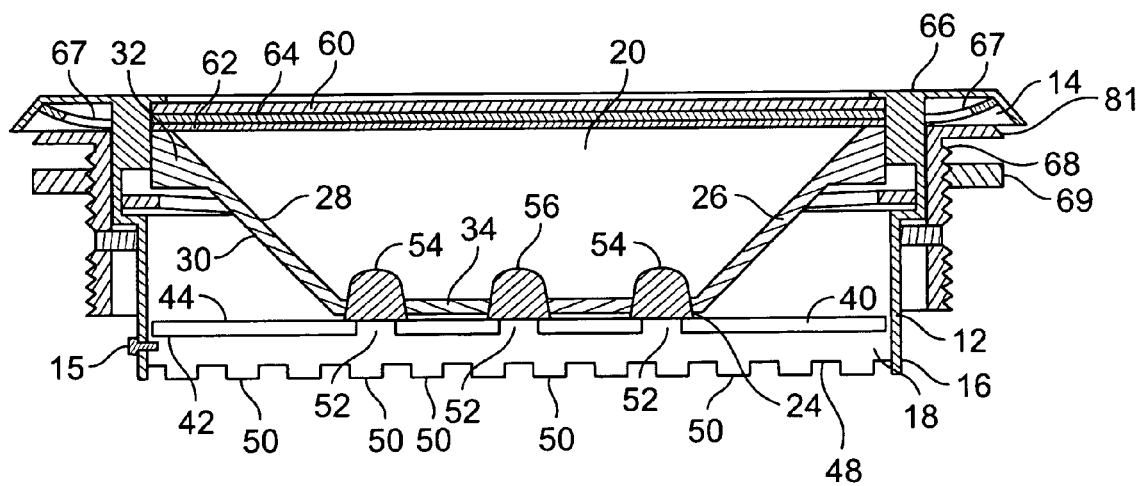
FIG. 2 is a side cutaway view of a light fixture and mounting flange assembly configured according to one embodiment of the invention.
Figure 3:
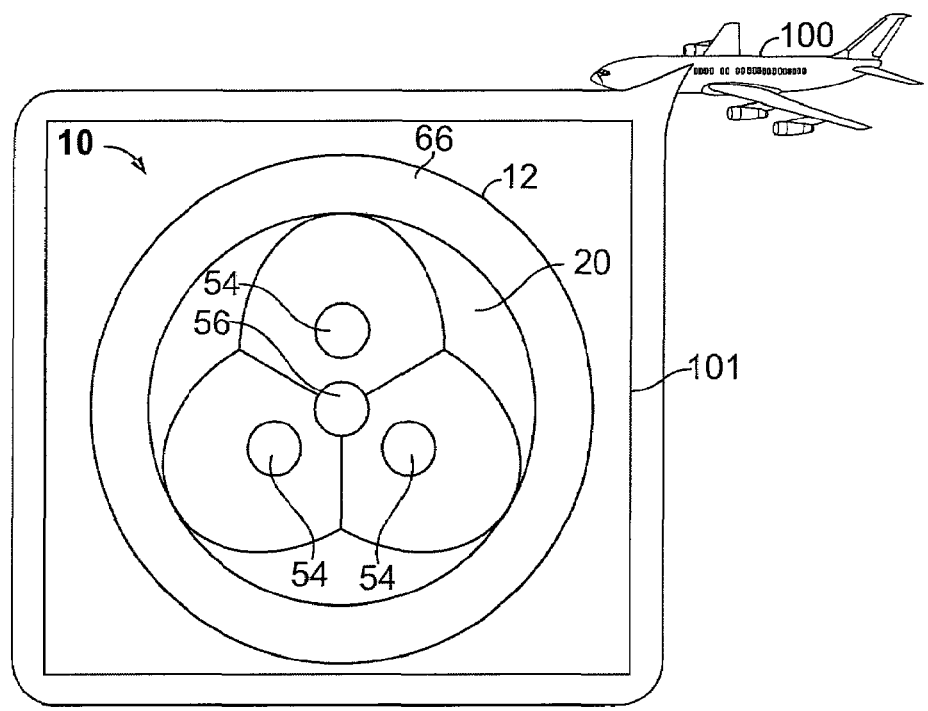
FIG. 3 is a top view of a light fixture configured according to an embodiment of the invention.

The invention is generally directed to a light fixture for use in an LED lighting system for an aircraft or other transportation vehicle. Referring to FIGS. 1-3, an embodiment of the light fixture, generally labeled 10, includes a housing 12 having a first end 14 and a second end 16. The housing includes a housing rim 66 adjacent to the first end 14. The housing may have a substantially cylindrical shape as depicted in the embodiment in FIGS. 1-3, however the housing is not limited to a cylindrical shape and in other embodiments of the invention the housing may be another shape. The second end 16 is attached to a base plate 18. The housing 12 defines a passageway between the first end 14 and the second end 16 and has an exterior housing surface 13. A pin 11 extends from the exterior housing surface 13. The embodiment in FIG. 1 may have three pins 11. A different number of pins may be used in other embodiments. The housing 12 may be constructed of any suitable material including, but not limited to, aluminum.

Figure 4:
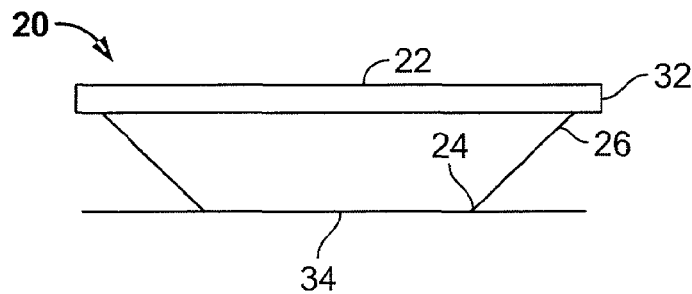
FIG. 4 is a side view of the reflector according to an embodiment of the invention.

A reflector 20 is positioned in the passageway within the housing 12. Referring to FIG. 4, the reflector 20 has an illumination end 22 and a bottom end 24. A reflector side wall 26 extends between the illumination end 22 and the bottom end 24 and defines an interior surface 28 (FIG. 2) and an exterior surface 30. At the illumination end 22 there is a reflector rim 32. The reflector side wall 26 is connected to a reflector base 34 that is adjacent to the bottom end 24 of the reflector 20. In an embodiment, the reflector base 34 has a smaller diameter than the reflector rim 32, and the reflector side wall 26 angles upward from the bottom end 24 of the reflector 20 as shown in FIG. 4. The angle may be about fifteen degrees to about seventy-five degrees. The interior surface 28 (FIG. 2) of the reflector side wall 26 is covered with a reflective surface treatment. The reflective surface treatment may be a flat, white, polyurethane paint or any other suitable coating or surface treatment known in the art.

Figure 5:
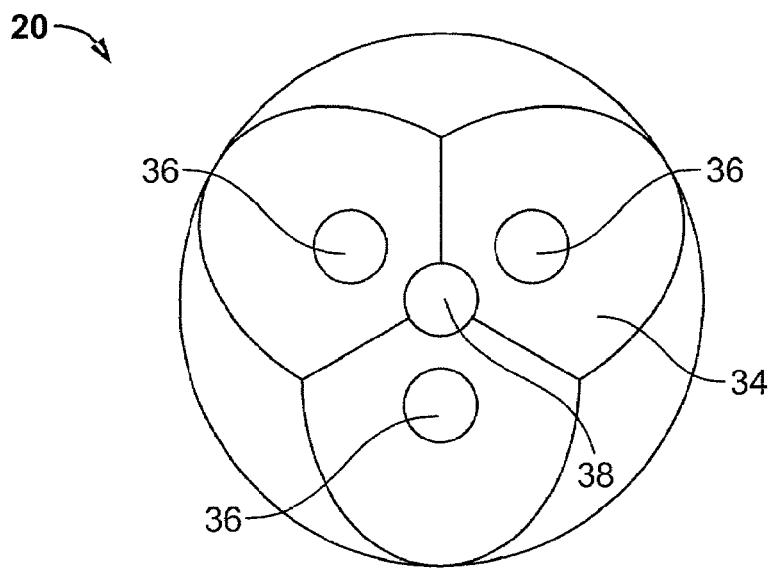
FIG. 5 is a top view of the reflector according to an embodiment of the invention.
Figure 6B:
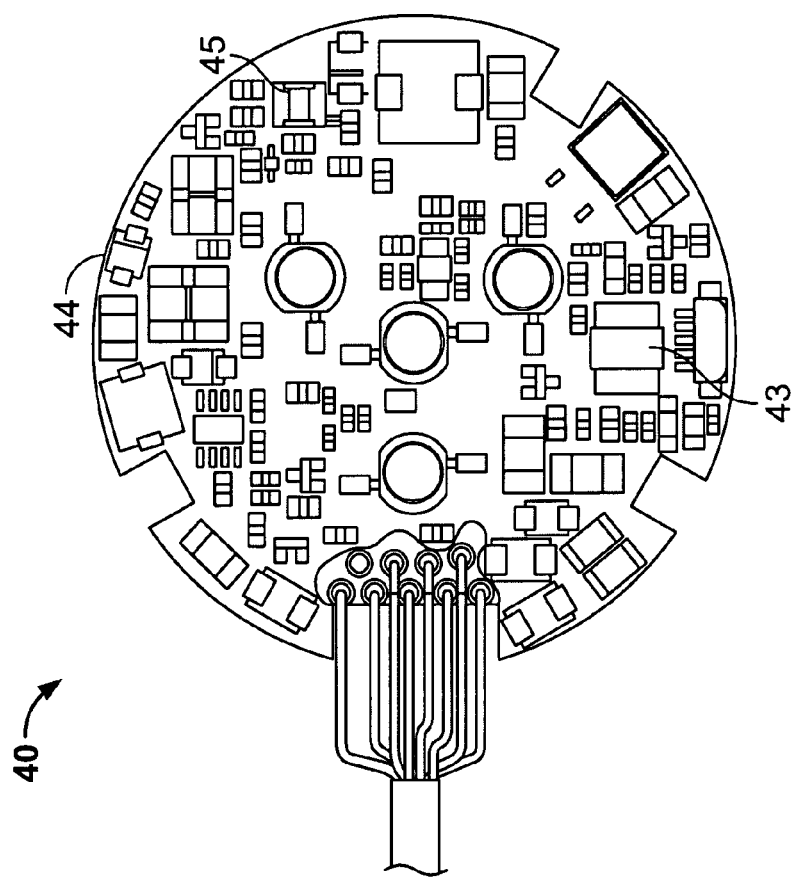
FIG. 6B is a view of the component side of the printed circuit board according to an embodiment of the invention.
Figure 6A:
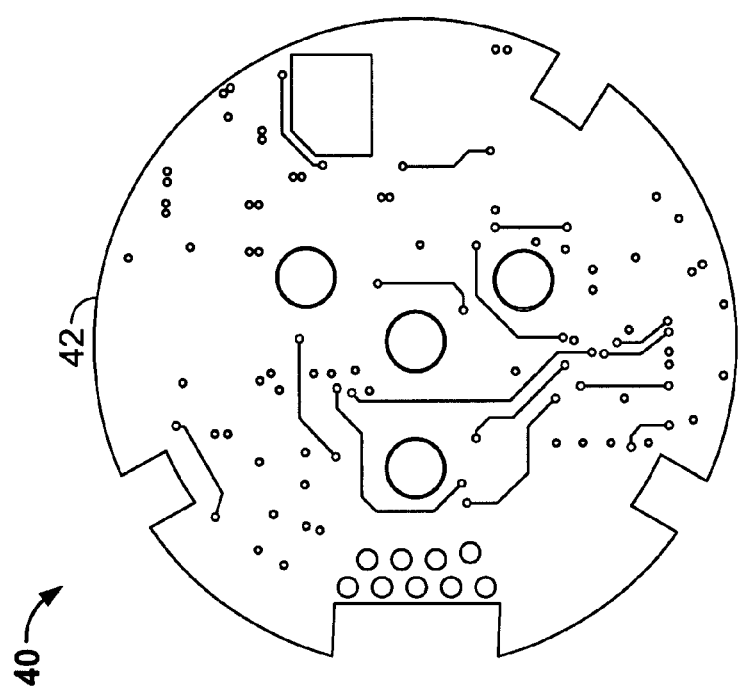
FIG. 6A is a view of the solder side of the printed circuit board according to an embodiment of the invention

Referring to FIG. 2, the reflector base 34 is disposed above a printed circuit board (PCB) 40 that is adjacent to the bottom end 24 of the reflector 20. As can be seen in FIG. 6, the PCB 40 has a solder side 42 and a component side 44. Referring again to FIG. 2, the solder side 42 is connected to the top of the base plate 18 by an adhesive layer. The base plate 18 is secured to the housing 12 by screws 15 positioned through the exterior housing surface 13. The base plate 18 has a bottom surface 48. The base plate 18 dissipates heat. In one embodiment, fins 50 extend from the bottom surface 48 of the base plate 18 to aid heat dissipation. There are raised plateaus 52 that extend from the top surface of the base plate 18 and through openings in the PCB 40. In the embodiment shown in FIG. 2, raised circular plateaus 52 extend through openings in the PCB 40 and in the direction of the LED openings 36 (FIG. 5) and the emergency light opening 38 (FIG. 5) in the reflector base 34.

The lighting device utilizes LEDs to provide illumination. One embodiment of the invention may utilize three, white, high-output, side-emitting LEDs for illumination. The invention is not limited to white, side-emitting LEDs; other types or colors of LEDs may be used. In the embodiment, illustrated in FIG. 3, three white, high-output, side-emitting LEDs 54 are used for illumination, and an additional emergency LED 56 is used for lighting under emergency conditions. The emergency LED 56, in the embodiment illustrated in FIG. 3, is a white, Lambertian LED. The emergency LED 56 is not limited to a white, Lambertian LED; in other embodiments a different type or color of LED may be used. In the embodiment depicted in FIGS. 2-3, the emergency LED 56 is positioned in the center of the reflector 20. The position of the emergency LED 56 is not limited to the center of the reflection 20.

The reflector base 34 defines openings for the LEDs to be mounted through. In an embodiment seen in FIG. 5, there are three LED openings 36 in the reflector base 34. Each LED opening 36 is large enough to allow a LED to protrude through it. In the embodiment, there is also one emergency light opening 38 in the reflector base 34. Likewise, the emergency light opening 38 is large enough to allow protrusion through of an emergency LED 56. In still another embodiment the reflector base 34 may only include a LED opening 36.

Referring now to FIG. 2, the LEDs 54, 56 are attached to the raised plateaus 52 of the base plate 18 using an adhesive layer, and extend through the LED openings 36 (FIG. 5) and through the emergency light opening 38 (FIG. 5) in the reflector base 34. In the current embodiment, the base plate 18 and the raised plateaus 52, function as a heat sink drawing heat away from the LEDs 54, 56 and dissipating it through the fins 50 and the bottom surface 48 of the base plate 18. This creates a short, efficient thermal path to the heat dissipating surfaces, thereby minimizing the lighting device size and profile and reducing overall weight. In one embodiment, the base plate 18 is made of an aluminum alloy.

Referring to FIG. 2, the lighting fixture has a first lens 60, a filter 64, and a second diffusing lens 62 all attached to the first end 14 of the housing 12 and held in place by the housing rim 66. In one embodiment, both the first lens 60 and the diffusing lens 62 are made of polycarbonate and the filter 64 is a colored polycarbonate filter. It is not necessary, however, to use a filter to achieve effective diffuse, ambient lighting.

The operation of the embodiment of the lighting device 10 in FIGS. 1-6 will now be discussed. When in operation, power is supplied to the lighting device 10 such that the three white side-emitting LEDs 54 are illuminated and emit light from their respective sides. The light emitted by the side-emitting LEDs 54 (FIG. 2) is mixed by the interior surface 28 of the reflector side wall 26 and projected forward by the angle of the side walls 26, thereby approximating a parabolic reflector. The beam of light produced is projected through the diffusing lens 62, the filter 64, and the first lens 60. In this particular embodiment a warm filter 64 is used to provide warm toned light. It is possible, however, to provide bright ambient light without the filter 64 or with a filter designed to provide the desired lighting effect. The diffusing lens 62, and first lens 60 disperse the beam of light reflected by the reflector 20 into widely distributed light.

For exemplary purposes, if the lighting device, as described above, is mounted into the overhead of the passenger aisle of a commercial aircraft, the light provided will be bright enough that a passenger can clearly see the floor, aisle, and the surrounding space but not so concentrated that the light is blinding when viewed directly.

In the embodiment illustrated in FIGS. 1-6, the three side-emitting LEDs 54 are used to provide ambient light during non-emergency conditions and the one emergency LED 56 is used to provide light only during emergency conditions. In this embodiment, only the emergency LED 56 will be illuminated during the emergency conditions; the side-emitting LEDs 54 will not be illuminated under emergency conditions. In another embodiment of the lighting device 10, only the three side-emitting LEDs 54 are used to provide ambient light.

Figure 7:
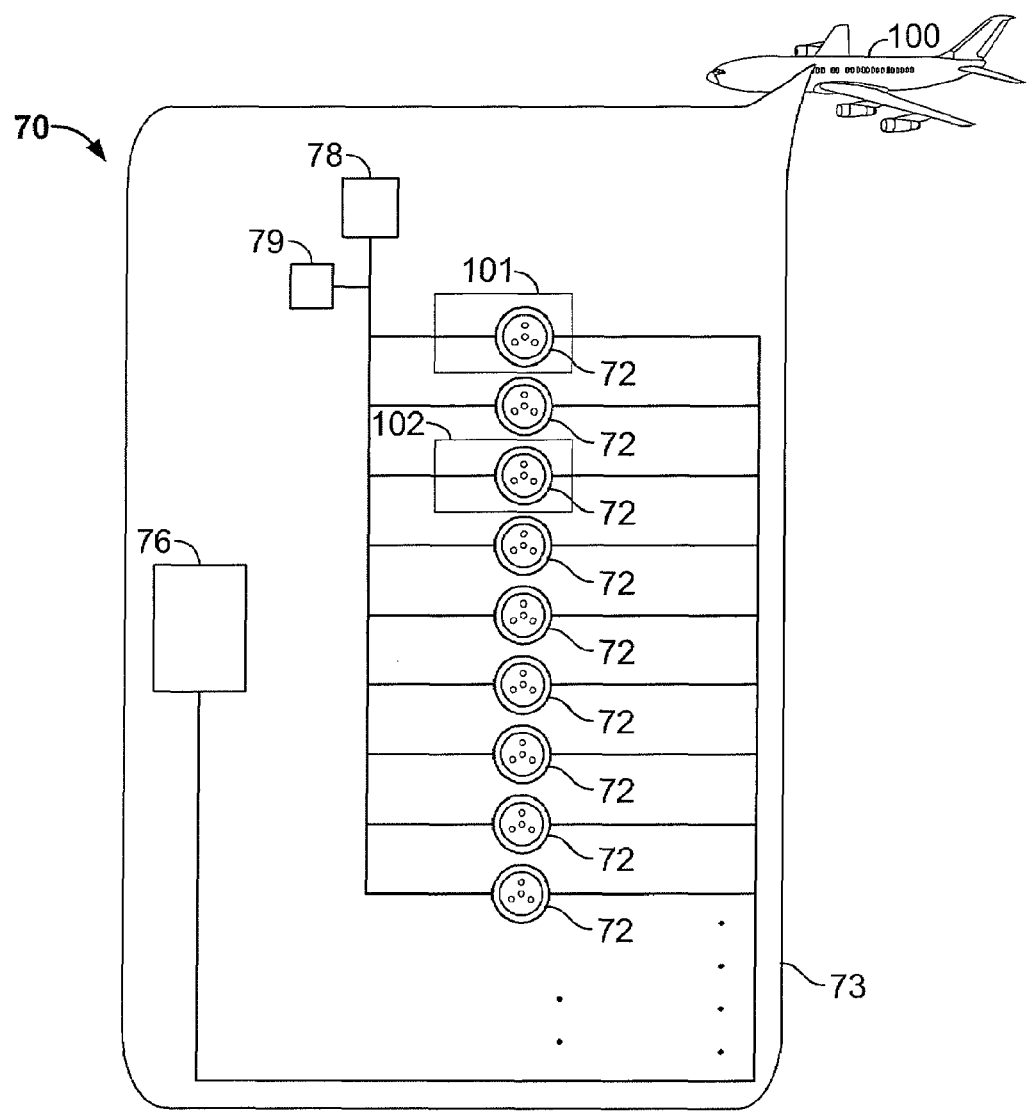
FIG. 7 is an example of a system in which an embodiment of the light fixture described herein may be used.

The lighting device 10 (72 in FIG. 7) has been designed so that it can be mounted without hardware from the interior side of an aircraft 100 ceiling panel 101 (see FIGS. 3 and 7) or wall panel 102 see FIG. 7 into a previously installed mounting flange assembly. Thus, replacement of the lighting device only requires access to the interior side of the ceiling or wall panel. Only during the initial installation of the lighting device 10 is access possibly required to the back of the panels in which the lights are installed. This is important since dome lights are often mounted in aircraft ceiling and walls panels making the lights difficult to access from the back. FIG. 2 shows an embodiment of a mounting flange assembly holding the lighting fixture. In FIG. 2, the mounting flange assembly comprises a mounting flange 68 and a threaded securing nut 69, which may be constructed of aluminum alloy. The lighting device is received into the mounting flange 68 with the housing rim 66 disposed on top of the mounting flange 68.

Figure 8:
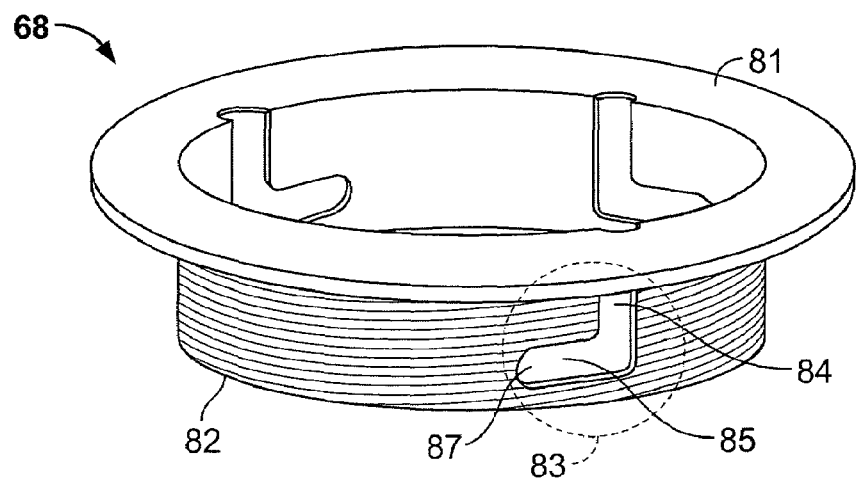
FIG. 8 is an example of a mounting flange used in an embodiment of the invention.

FIG. 8 is an illustration of an embodiment of the mounting flange 68. The mounting flange 68 has a rim 81 and a bottom flange edge 82. The mounting flange 68 defines at least one flange opening 83. In the embodiment illustrated in FIG. 8, there may be three flange openings 83, although other numbers of flange openings are possible. The flange opening 83 in the embodiment in FIG. 8 comprises a first channel 84 adjacent to a second channel 85. The first channel 84 is substantially perpendicular to the rim 81 and the second channel 85 is substantially horizontal to the rim 81. The second channel 85 has an endpoint 87. The lighting device 10 (FIG. 1) is inserted into the mounting flange 68 such that a pin 11 (FIG. 1) disposed on the housing 12 slides into the first channel 84 (FIG. 8). The lighting device 10 (FIG. 1) is manipulated such that the pin 11 (FIG. 1) is moved adjacent to the endpoint 87 (FIG. 8) of the second channel 85 (FIG. 8). A resilient member 67 (FIG. 2), such as a wave washer, is disposed between the rim 81 of the mounting flange 68 and the housing rim 66. The resilient member 67 causes a force to be applied to the pin 11 (FIG. 1) positioned in the second channel 85 (FIG. 8). The force applied by the resilient member 67 causes the pin 11 to be held in place and holds the lighting device to the mounting flange. In the embodiment shown in FIG. 8 there are three flange openings 83 into which each receives a pin 11.

The manner in which the lighting device 10 is electrically connected will now be described. For the embodiment illustrated in FIGS. 1-6, the side-emitting LEDs 54 are each electrically connected to drive circuitry located on the PCB 40. The side-emitting LEDs 54 are connected in series. The series of side-emitting LEDs 54 are connected to a 28 volt DC source 78 (the power source is shown in FIG. 7) by way of a switching regulator 45 and controlled by a programmable microcontroller 43 as shown in FIG. 6.

The microcontroller 43 runs firmware that allows the use of a range of control signals known in the art such as momentary switches, Hall-Effect sensors, and pulse controls. In one embodiment, a pulse controlled signal is used to control the intensity of the side-emitting LEDs 54.

The emergency LED 56 receives current from a power source 79 (as shown in FIG. 7) different from that of the side-emitting LEDs 54. The side-emitting LEDs 54 are not illuminated at the same time as the emergency LED 56.

An example of a lighting system in which the invention may be used is shown in FIG 7. The lighting system, generally labeled 70, includes multiple light fixtures 72. Each light fixture is electrically connected to the system at a specific location along a wiring harness 73. The system 70 also includes lighting controller 76. The lighting controller 76 transmits a control signal to each of the light fixtures 72 to provide illumination for the aisles of an aircraft 100.

All references, including publications, patent applications and patents, cited herein are hereby incorporated by reference to the same extent as if each reference were individually and specifically indicated to be incorporated by reference and set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A lighting device comprised of:
   a substantially cylindrical housing defining a passageway therethrough, the housing having a first end, a second end with a base plate attached to the second end, a housing rim adjacent to the first end of the housing and at least one attachment point disposed on and extending from an exterior surface of the housing;
   a reflector positioned within the housing, the reflector having an illumination end, a bottom end proximal to the base plate and a reflector base adjacent to and extending across the bottom end of the reflector, the reflector base defining a plurality of openings;
   a printed circuit board adjacent the bottom end of the reflector;
   a plurality of light-emitting diodes (LEDs) electrically connected to the printed circuit board, wherein one of the plurality of LEDs is located within one of the plurality of openings in the reflector base;
   a first lens adjacent to the first end of the housing;
   a mounting flange including a rim, the mounting flange circumscribing the housing and mounted within one of an aircraft wall panel and an overhead panel, the mounting flange defining at least one opening receiving the at least one attachment point; and
   a resilient member disposed between the rim of the mounting flange and the housing rim, wherein the rim of the mounting flange, the resilient member and the housing rim are disposed along an axis that is substantially perpendicular to a plane in which the first lens is disposed.

2. The lighting device of claim 1, wherein each of the plurality of LEDs are mounted on a heat sink.

3. The lighting device of claim 1, further comprising:
   a substantially cylindrical reflector side wall comprising an interior surface and an exterior surface extending between the illumination end and the bottom end of the reflector; and
   a substantially circular reflector rim attached to the illumination end.

4. The lighting device of claim 3, wherein the reflector side wall extends at an angle from the bottom end of the reflector and the angle is from about 15 degrees to about seventy-five degrees.

5. The lighting device of claim 3, wherein the interior surface of the reflector side wall is covered with a reflective surface treatment.

6. The lighting device of claim 1, wherein the printed circuit board comprises a component side and a solder side, and the solder side is connected to the base plate, and the base plate dissipates heat.

7. The lighting device of claim 1, further comprising a plurality of raised plateaus extending from the base plate, wherein one of the plurality of raised plateaus extends in the direction of one of the plurality of openings in the reflector base and one of the plurality of LEDs is attached to one of the plurality of raised plateaus.

8. The device of claim 1, further comprising:
   a filter adjacent to the first lens;
   a diffusing lens adjacent to the filter and distal to the first lens; and
   the housing rim holding the first lens, the filter, and the diffusing lens onto the housing.

9. The device of claim 8, wherein the filter is a color filter.

10. A lighting system comprised of:
    an aircraft;
    a power source disposed on the aircraft;
    a lighting device electrically connected to the power source by a wiring harness, the lighting device comprising:
      a substantially cylindrical housing defining a passageway therethrough, the housing having a first end, a second end with a base plate attached to the second end, a housing rim adjacent to the first end of the housing and at least one attachment pin disposed on and extending from an exterior surface of the housing;
      a reflector positioned within the housing, the reflector having an illumination end and a bottom end proximal to the base plate;
      a printed circuit board adjacent the bottom end of the reflector;
      a plurality of light-emitting diodes (LEDs) electrically connected to the printed circuit board;
      a first lens attached to the first end of the housing; and
      a microcontroller electrically connected to the LEDs for controlling the illumination of the LEDs;
    a lighting controller electrically connected to the microcontroller of the lighting device, transmitting a control signal to the light fixture to provide illumination of the light fixture;
    a mounting flange including a rim, the mounting flange circumscribing the housing mounted within one of the aircraft wall panel and an overhead panel, the mounting flange defining at least one opening receiving the at least one attachment pin; and
    a resilient member disposed between the rim of the mounting flange and the housing rim wherein the rim of the mounting flange, the resilient member and the housing rim are disposed along an axis that is substantially perpendicular to a plane in which the first lens is disposed.

11. The vehicle lighting system of claim 10 wherein the plurality of LEDs in each lighting device are comprised of side-emitting LEDs.

12. The vehicle lighting system of claim 11 further comprising:

an emergency LED connected to the printed circuit board of the lighting device;
a first power source connected to the plurality of LEDs; and
a second power source independent of the first power source, electrically connected to the emergency LED such that the plurality of LEDs are independent to the emergency LED.

13. The vehicle lighting system of claim 12 wherein the emergency LED is a Lambertian LED.

14. The vehicle lighting system of claim 11 wherein the side emitting LEDs are white.

15. The vehicle lighting system of claim 11 wherein a signal controls the intensity of the side-emitting LEDs in the lighting device.

16. A lighting device comprised of:
a substantially cylindrical housing defining a passageway therethrough, the housing having a first end, a second end, a housing rim adjacent to the first end of the housing and an exterior housing surface with a base plate attached to the second end;
a reflector positioned within the housing, the reflector having an illumination end, a bottom end proximal to the base plate and a reflector base adjacent to and extending across the bottom end of the reflector, the reflector base defining a plurality of openings;
a substantially cylindrical reflector side wall having an interior surface and an exterior surface extending between the illumination end and the bottom end of the reflector wherein the interior surface of the reflector side wall is covered with a reflective surface treatment;
a printed circuit board adjacent the bottom end of the reflector;
a plurality of side-emitting light-emitting diodes (LEDs) electrically connected to the printed circuit board wherein one of the plurality of LEDs is located within one of the plurality of openings in the reflector base;
a programmable microcontroller providing intensity control of the side-emitting LEDs;
a diffusing lens attached to the first end of the housing;
a pin disposed on and extending from the exterior housing surface;
a mounting flange including a rim wherein the mounting flange defines an opening into which is received the pin, the mounting flange circumscribing the housing mounted within one of the aircraft wall panel and an overhead panel; and
a resilient member disposed between the rim of the mounting flange and the housing rim wherein the rim of the mounting flange, the resilient member and the housing rim are disposed along an axis that is substantially perpendicular to a plane in which the diffusing lens is disposed.

* * * * *